(12) United States Patent
Storer

(10) Patent No.: US 9,328,821 B2
(45) Date of Patent: May 3, 2016

(54) HYDROSTATIC DRIVE SYSTEM

(71) Applicant: Caterpillar Inc., Peoria, IL (US)

(72) Inventor: Corwin E. Storer, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 339 days.

(21) Appl. No.: 13/913,693

(22) Filed: Jun. 10, 2013

(65) Prior Publication Data

US 2014/0360173 A1 Dec. 11, 2014

(51) Int. Cl.

| | |
|---|---|
| *F16D 31/02* | (2006.01) |
| *F16H 61/4008* | (2010.01) |
| *F16H 61/4035* | (2010.01) |
| *F16H 61/44* | (2006.01) |
| *E02F 3/76* | (2006.01) |
| *E02F 9/22* | (2006.01) |
| *F16H 59/68* | (2006.01) |

(52) U.S. Cl.
CPC .......... *F16H 61/4008* (2013.01); *E02F 3/7645* (2013.01); *E02F 9/2235* (2013.01); *E02F 9/2253* (2013.01); *F16H 61/4035* (2013.01); *F16H 61/44* (2013.01); *B60Y 2200/411* (2013.01); *F16H 2059/6861* (2013.01)

(58) Field of Classification Search
CPC .......................... F16H 61/4008; F16H 61/4035
See application file for complete search history.

(56) References Cited

U.S. PATENT DOCUMENTS

| | | | |
|---|---|---|---|
| 3,724,583 A | | 4/1973 | Caldwell |
| 5,996,343 A | * | 12/1999 | Kuras ............................... 60/448 |
| 6,385,970 B1 | | 5/2002 | Kuras et al. |
| 7,628,240 B2 | | 12/2009 | Caldwell |
| 8,347,618 B2 | | 1/2013 | Dostal et al. |
| 8,393,150 B2 | | 3/2013 | Brickner et al. |
| 2009/0298635 A1 | * | 12/2009 | Kuras et al. ..................... 475/53 |
| 2009/0314571 A1 | | 12/2009 | Fausch |
| 2011/0030364 A1 | | 2/2011 | Persson et al. |
| 2012/0152056 A1 | | 6/2012 | Du et al. |

FOREIGN PATENT DOCUMENTS

| | | |
|---|---|---|
| DE | 4416723 | 11/1995 |
| FR | 2741130 | 5/1997 |
| FR | 2741130 A1 * | 5/1997 |
| JP | 03574675 | 10/2004 |
| KR | 20130012579 | 2/2013 |

OTHER PUBLICATIONS

FR 2741130—Machine Translation from Espacenet, Hydrostatic transmission, Pub date—May 1997.*

\* cited by examiner

*Primary Examiner* — Edward Look
*Assistant Examiner* — Daniel Collins
(74) *Attorney, Agent, or Firm* — Leydig, Voit & Mayer, Ltd.

(57) ABSTRACT

A hydrostatic drive system for a machine is provided. The hydrostatic drive system includes a first hydraulic circuit, and a second hydraulic circuit. The first hydraulic circuit includes a first pump and a first hydraulic motor configured to selectively receive a flow of pressurized hydraulic fluid from the first pump at a first pressure. The second hydraulic circuit includes a second pump and a second hydraulic motor configured to selectively receive the flow of the pressurized hydraulic fluid from the second pump at a second pressure. The hydrostatic drive system further includes a controller configured to maintain a pressure balance between the first and the second hydraulic circuits based on a difference between the first pressure and the second pressure.

19 Claims, 4 Drawing Sheets

HYDROSTATIC DRIVE SYSTEM

TECHNICAL FIELD

The present disclosure relates to a hydrostatic drive system of a machine, and particularly to a system and method of maintaining a pressure balance between multiple hydraulic circuits of the hydrostatic drive system.

BACKGROUND

Large wheel base types of machines, such as motor graders, may have hydrostatic drive systems for driving the rear wheels or tracks, whereas the front wheels are used for steering. The hydrostatic drive system may include multiple hydraulic circuits associated with respective wheels or tracks. It is generally desired to maintain a pressure balance between the multiple hydraulic circuits.

During operations, there may be pressure fluctuations and imbalance between the individual hydraulic circuits of the hydrostatic drive system, due to size of the wheels, calibration errors, or fluid leakage etc. The pressure imbalance in these hydraulic circuits may cause unnecessary turning of the machine. Further, in machines, where the front wheels are only used for steering purposes and are hydraulically non-powered, an operator may tend to compensate for the pressure imbalance by manually steering the front wheels without realizing the pressure imbalance between the hydraulic circuits driving the rear wheels. This may result in loss of efficiency of the machine and energy loss in the hydrostatic drive system.

Conventionally, a speed feedback mechanism, using speed sensors, is used to maintain the pressure balance. However, using speed sensors may not be effective for the machines where the front wheels are used for steering purposes, as an error in the speed may not be realized because the operator may compensate for the pressure imbalance by steering.

U.S. Pat. No. 8,347,618 relates to a dual pump hydraulic system for a vehicle driven by an internal combustion engine. The system includes a first circuit with a first high pressure pump supplying hydraulic fluid to the first subsystem at a higher pressure. The system also includes a second circuit with a second lower pressure pump supplying hydraulic fluid to the second subsystem at a second pressure. A first valve controls communication between the first pump and the second circuit. A second valve is operable to communicate the second pump with the first circuit when pressure in the first circuit is less than a second threshold pressure or when commanded by a control unit. A check valve prevents fluid flow from the first circuit back into to the second valve.

However, using pressure balance valves is also not effective, as there may be loss of pressure and efficiency and also, the pressure balance valves are expensive to implement. Therefore, there is a need for an improved system and method to maintain pressure balance between the hydraulic circuits in the hydrostatic drive system.

SUMMARY

In one aspect, a hydrostatic drive system for a machine is provided. The hydrostatic drive system includes a first hydraulic circuit, and a second hydraulic circuit. The first hydraulic circuit includes a first pump and a first hydraulic motor configured to selectively receive a flow of pressurized hydraulic fluid from the first pump at a first pressure. The second hydraulic circuit includes a second pump and a second hydraulic motor configured to selectively receive the flow of the pressurized hydraulic fluid from the second pump at a second pressure. The hydrostatic drive system further includes a controller configured to maintain a pressure balance between the first and the second hydraulic circuits based on a difference between the first pressure and the second pressure.

In another aspect, a machine is provided. The machine includes ground engaging members disposed on a first side and a second side of the machine. The machine further includes a power source and a hydrostatic drive system operatively coupling the power source to the ground engaging members. The hydrostatic drive system includes a first hydraulic circuit, and a second hydraulic circuit. The first hydraulic circuit includes a first pump and a first hydraulic motor configured to selectively receive a flow of pressurized hydraulic fluid from the first pump at a first pressure. The second hydraulic circuit includes a second pump and a second hydraulic motor configured to selectively receive the flow of the pressurized hydraulic fluid from the second pump at a second pressure. The hydrostatic drive system further includes a controller configured to maintain a pressure balance between the first and the second hydraulic circuits based on a difference between the first pressure and the second pressure.

In a yet another aspect, a method for maintaining a pressure balance between a first hydraulic circuit having a first pump and a second hydraulic circuit having a second pump, is provided. The method includes receiving pressure signals from a first pressure sensor and a second pressure sensor corresponding to a first pressure in the first hydraulic circuit. The method further includes receiving pressure signals from a third pressure sensor and a fourth pressure sensor corresponding to a second pressure in the second hydraulic circuit. Furthermore, the method includes controlling displacement of the first pump and the second pump based on a difference between the first pressure and the second pressure.

DETAILED DESCRIPTION

The present disclosure relates to a hydrostatic drive system of a machine and particularly to a system and method for maintaining a pressure balance between multiple hydraulic circuits of the hydrostatic drive system of the machine.

Figure 1:
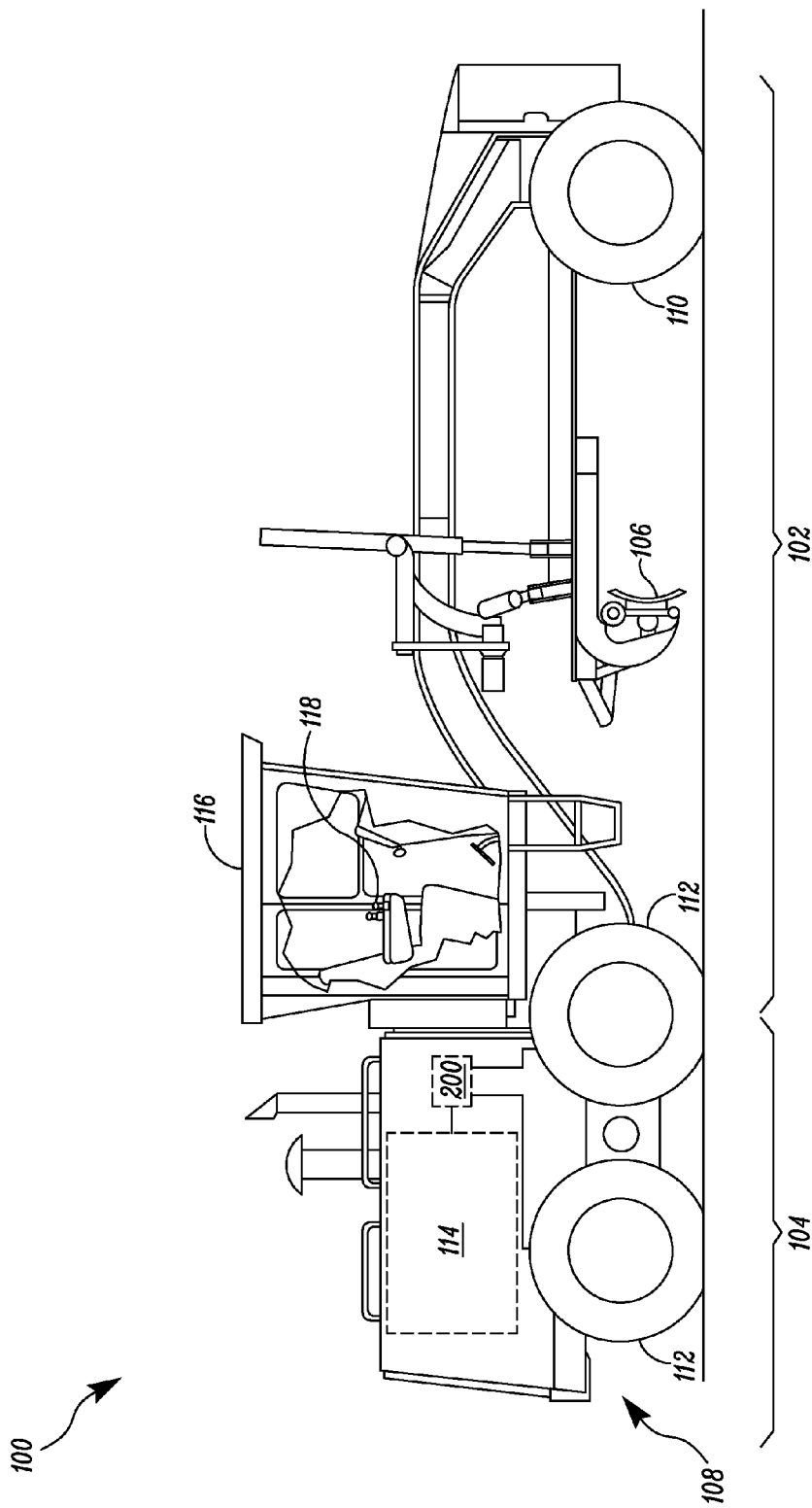
FIG. 1 illustrates an exemplary machine.

FIG. 1 illustrates an exemplary machine 100. In an aspect of the present disclosure, the machine 100 may be embodied as a motor grader which may perform various operations associated with an industry such as mining, construction, farming, transportation, or any other industry known in the art. In various other embodiments, the machine 100 may be a cold planar machine, a crop sprayer, a skidder, a road reclaimer, a rotary mixer machine, a soil compactor machine, and a wheel tractor-scraper.

In the illustrated embodiment, the machine 100 may include a front frame 102, a rear frame 104, and an implement 106, such as a blade. The front frame 102 and the rear frame 104 frame are supported by a number of ground engaging members 108. The ground engaging members 108 may include a pair of front wheels 110 and two pairs of rear wheels 112 (only one side is shown in FIG. 1) disposed on a first side and a second side of the machine 100. The front wheels 110 and the rear wheels 112 may be adapted for steering the machine 100 and for propelling the machine 100 in forward and reverse directions, respectively. Alternatively, the ground engaging members 108 may be embodied as tracks.

As shown in FIG. 1, the machine 100 may further include a power source 114 such as an engine, and an operator station 116. The power source 114 may be mounted on the rear frame 104. The power source 114 may be a diesel engine, a gasoline engine, a gaseous fuel-powered engine, a hydrogen-powered engine, or any other type of combustion engine known in the art. Alternatively, the power source 114 may be a non-combustion source of power such as a fuel cell, a power storage device, a solar cell, or another suitable source of power. The power source 114 may produce mechanical and/or electrical power output, that may be converted to hydraulic power The operator station 116 may include various controls necessary to operate the machine 100, for example, one or more operator input devices 118 for controlling the speed and direction of travel of the machine 100, controlling the implement 106, and for controlling other components associated with the machine 100. The operator input devices 118 may include one or more devices such as joysticks, levers, pedals, user interfaces, displays etc., and may be configured to receive input from an operator indicative of a desired movement of the implement 106 and/or the machine 100. The operator station 116 is mounted on the front frame 102.

Figure 2:
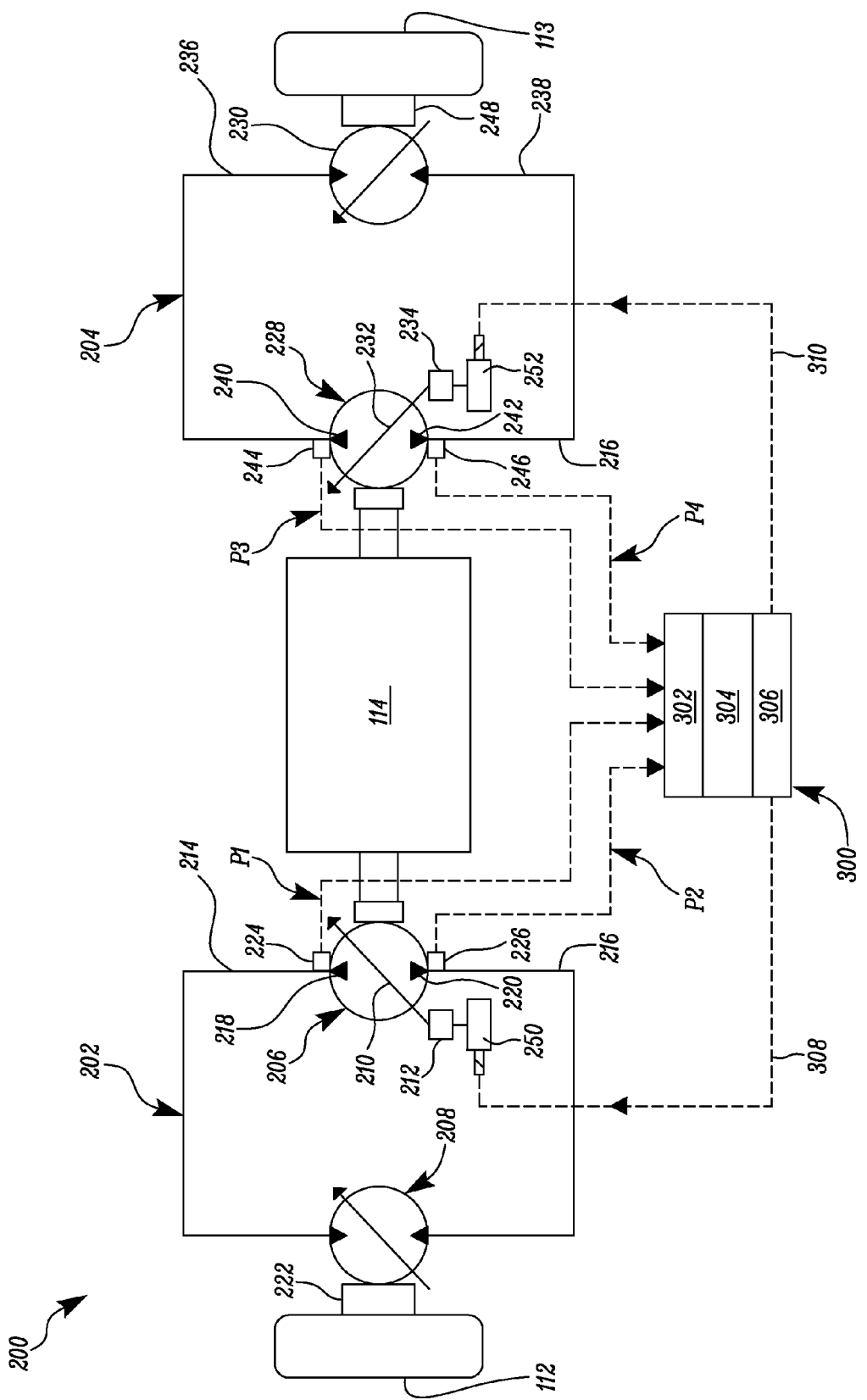
FIG. 2 illustrates a schematic view of a hydrostatic drive system of the machine of FIG. 1, according to an embodiment of the present disclosure.

The machine 100 includes one or more powered components operatively connected to the power source 114. The power source 114 may provide rotational power to the powered components. In an exemplary aspect, one of the powered components may be a hydrostatic drive system 200 associated with the ground engaging members 108, the hydrostatic drive system 200 is schematically shown in FIG. 2. The hydrostatic drive system 200 operatively couples the power source 114 to the ground engaging members 108, such as the two pairs of the rear wheels 112 of the machine 100. In an aspect, the hydrostatic drive system 200 may be a multipath hydrostatic drive system including two or more closed fluid loops or hydraulic circuits, such as a first hydraulic circuit 202 and a second hydraulic circuit 204. The first and the second hydraulic circuits 202, 204 use a flow of pressurized hydraulic fluid to transfer the rotational power from the power source 114 to the rear wheels 112. While the dual path hydrostatic drive system 200 will now be described in conjunction with FIG. 2, it will be apparent to a person having ordinary skill in the art that the hydrostatic drive system 200 may include more than two hydraulic circuits based on application and type of machine.

The first and the second hydraulic circuits 202, 204 operatively couple the power source 114 to the rear wheels 112, 113 provided on the first and the second side of the machine 100, respectively. In an aspect of the present disclosure, the first hydraulic circuit 202 may include a first pump 206 fluidically connected to a tank (not shown), and a first hydraulic motor 208. The first pump 206 may be configured to pressurize the hydraulic fluid drawn from the tank and supply to the first hydraulic motor 208 at a first pressure. The tank may constitute a low-pressure reservoir adapted to hold a supply of hydraulic fluid. The hydraulic fluid may include hydraulic oil, lubrication oil, or any other fluid known in the art.

In an aspect of the present disclosure, the first pump 206 may be a variable displacement hydraulic pump of a well known construction and type, such as, a gear pump, a rotary vane pump, a screw pump, an axial piston pump or a radial piston pump. The first pump 206 may be connected to the power source 114 to drive the first pump 206. In an aspect, the first pump 206 may include a first movable swash plate 210 connected to a first swash plate control valve 212.

Further, a first pump conduit 214 and a second pump conduit 216 may be connected to the first pump 206. In an aspect of the present disclosure, the first pump 206 may include a first port 218 and a second port 220. The first pump conduit 214 is hydraulically connected to the first port 218 of the first pump 206. The second pump conduit 216 is hydraulically connected to the second port 220 of the first pump 206.

The first pump 206 may selectively supply a flow of the pressurized hydraulic fluid to the first hydraulic motor 208 through one of the first and the second pump conduits 214, 216 via a direction control valve (not shown). A pair of cross-line pressure relief valves (not shown) may be provided to interconnect the first and the second pump conduits 214, 216. The pressure relief valves may be configured to allow an excessive pressure above a predetermined value in one of the first and second pump conduits 214, 216 to relieve to the other of the first and the second pump conduits 214, 216. In an aspect of the present disclosure, the first hydraulic motor 208 may also be a variable displacement hydraulic motor of any well known construction and type.

As will be understood by a person skilled in the art, the first pump 206 is configured to convert the rotational power of the power source 114 into the pressurized fluid flow at the first pressure. Further, the first hydraulic motor 208 may convert the pressurized fluid flow back into rotational motion that is used to drive the rear wheels 112 on the first side of the machine 100. In an exemplary aspect, the first hydraulic motor 208 may drive a first gear assembly 222 that may be meshed with the rear wheel 112 on the first side of the machine 100. When the first gear assembly 222 rotates, the rear wheel 112 is urged to move and propel the machine 100 across a terrain. In an aspect of the present disclosure, the first gear assembly 222 may be a planetary gear assembly.

In an aspect of the present disclosure, the first hydraulic circuit 202 may further include one or more pressure sensors, such as a first pressure sensor 224, and a second pressure sensor 226 provided at the first port 218 and the second port 220 of the first pump 206 respectively. The pressure sensors 224, 226 may be configured to detect a real time pressure associated with the first pump conduit 214 and the second pump conduit 216 respectively. In an aspect of the present disclosure, the pressure sensors 224, 226 may be configured to provide pressure signals indicative of a first pressure associated with the first hydraulic circuit 202. Examples of the pressure sensors 224, 226 may include a piezoelectric pressure sensor, a piezoresistive pressure sensor, a capacitive pressure sensor, electromagnetic pressure sensor, etc.

Further, as shown in FIG. 2, the hydrostatic drive system 200 includes the second hydraulic circuit 204 having a second pump 228 fluidically connected to the tank, and a second hydraulic motor 230 fluidically coupled to the second pump 228. Similar to the first pump 206 and the first hydraulic motor 208, the second pump 228 and the second hydraulic motor 230 may be variable displacement pump and variable displacement motor, respectively.

The second pump 228 may be connected to the power source 114 to drive the second pump 228. In an aspect of the present disclosure, the second pump 228 may include a second movable swash plate 232 connected to a second swash plate control valve 234. The second pump 228 may be configured to pressurize the hydraulic fluid drawn from a respective tank and supply to the second hydraulic motor 230 at a second pressure.

Further, a third pump conduit 236 and a fourth pump conduit 238 may be connected to the opposite sides of the second pump 228. In an aspect of the present disclosure, the second pump 228 may include a first port 240 and a second port 242. The third pump conduit 236 is hydraulically connected to the first port 240 of the second pump 228. The fourth pump conduit 238 is hydraulically connected to the second port 242 of the second pump 228. The second pump 228 may selectively supply a flow of the pressurized hydraulic fluid to the second hydraulic motor 230 through one of the third and the fourth pump conduits 236, 238 via a direction control valve (not shown).

The second hydraulic circuit 204 may further include a third pressure sensor 244 and a fourth pressure sensor 246 provided at the first port 240 and the second port 242 of the second pump 228 respectively. The third and the fourth pressure sensors 244, 246 may be configured to detect a real time pressure associated with the third pump conduit 236 and the fourth pump conduit 238 respectively. In an aspect of the present disclosure, the third and the fourth pressure sensors 244, 246 may be configured to provide pressure signals indicative of the second pressure associated with the second hydraulic circuit 204.

As will be understood by a person skilled in the art, by controlling the direction of the fluid flow and displacement of the first and the second pump 206, 228 and the first and the second hydraulic motor 208, 230, the direction of travel and speed of the machine 100 may be controlled. For example, by setting the fluid flow in the first and the second pump 206, 228 and first and the second hydraulic motor 208, 230 in the forward direction, and increasing the displacement of first and the second pump 206, 228 and/or decreasing the displacement of first and the second hydraulic motor 208, 230, the speed of the rear wheels 112, 113 on the first side and the second side of the machine 100, in the forward direction is increased. By setting the fluid flow in first and the second pump 206, 228 and the first and the second hydraulic motor 208, 230 in the reverse direction, and increasing the displacement of first and the second pump 206, 228 and/or decreasing the displacement of first and the second hydraulic motor 208, 230, the speed of rear wheels 112, 113 on the second side of the machine 100, in the reverse direction is increased. In both the forward and reverse situations described above, decreasing the displacement of first and the second pump 206, 228 and/or increasing the displacement of first and the second hydraulic motor 208, 230 decreases the speed of rear wheels 112, 113 of the machine 100. As will be understood by a person skilled in the art, that the first and the second hydraulic circuits 202, 204 are used to control the speed and direction of the rear wheels 112, 113 of the machine 100 via the first gear assembly 222 and a second gear assembly 248.

Although the foregoing description is in conjunction with the hydraulic circuits 202, 204 each including single respective hydraulic motors 208, 230, it will be understood that the number of hydraulic motors in each hydraulic circuit is merely exemplary and may be varied without deviating from the scope of the present disclosure.

Furthermore, the hydrostatic drive system 200 may include a controller 300. The controller 300 may include one or more processors, microprocessors, central processing units, on-board computers, electronic control modules, and/or any other computing and control devices known to those skilled in the art. The controller 300 may run one or more software programs or applications stored in a memory location, read from a computer readable medium, and/or accessed from an external device operatively coupled to the controller 300 by any suitable communications network. In an aspect of the present disclosure, the controller 300 is configured to control operation of the first and the second pumps 206, 228. For example, the controller 300 may control the fluid flow in the first and the second hydraulic pumps 206, 228 by controlling the position of the first swash plate 210 and the second swash plate 232 respectively. In an aspect of the present disclosure, the controller 300 may implement a closed loop control circuit.

In an aspect of the present disclosure, the controller 300 may include a signal input unit 302, a system memory 304, and a processor 306. The signal input unit 302 may be configured to receive a first pressure signal P1 and a second pressure signal P2 from the first and the second pressure sensors 224, 226 corresponding to the first pressure in the first hydraulic circuit 202. Further, the signal input unit 302 may be configured to receive a third pressure signal P3 and a fourth pressure signal P4 from the third and the fourth pressure sensors 244, 246 corresponding to the second pressure in the second hydraulic circuit 204. The pressure signals P1, P2, P3, and P4 received from the pressure sensors 224, 226, 244 and 246 may be in the form of a voltage signal or a current signal.

Further, the system memory 304 may include for example, a Random Access Memory (RAM), a Read Only Memory (ROM), flash memory, a data structure, and the like. The system memory 304 may include a computer executable code to determine a first and a second output control signals C1, C2 based on the first and the second pressure of the hydraulic fluid in the first hydraulic circuit 202 and the second hydraulic circuit 204, respectively. The system memory 304 may be operable on the processor 306 to output the first output control signal C1 and the second control signal C2 to adjust the position of the first swash plate 210 and the second swash plate 232 via the first swash plate control valve 212 and the second swash plate control valve 234, respectively. In an exemplary aspect, the processor 306 may be configured to output the first output control signal C1 and transmit to a first solenoid valve 250 associated with the first swash plate control valve 212 via a first communication link 308. Further, the processor 306 may be configured to output the second output control signal C2 and transmit to a second solenoid valve 252 associated with the second swash plate control valve 234 via a second communication link 310. In an aspect of the present disclosure, the first and the second output control signals C1 and C2 may be based on a pressure difference ΔP between the first pressure of the first hydraulic circuit 202 and the second pressure of the second hydraulic circuit 204. In an aspect of the present disclosure, the solenoid valves 250, 252 may adjust the first pressure in the first hydraulic circuit 202 and the second pressure in the second hydraulic circuit 204 based on first output control signal C1 and the second output control C2, respectively. For example, the controller 300 is configured to increase the first pressure in the first hydraulic circuit 202 and/or decrease the second pressure in the second hydraulic circuit 204, and vice-versa, to minimize the pressure difference ΔP.

Figure 3:
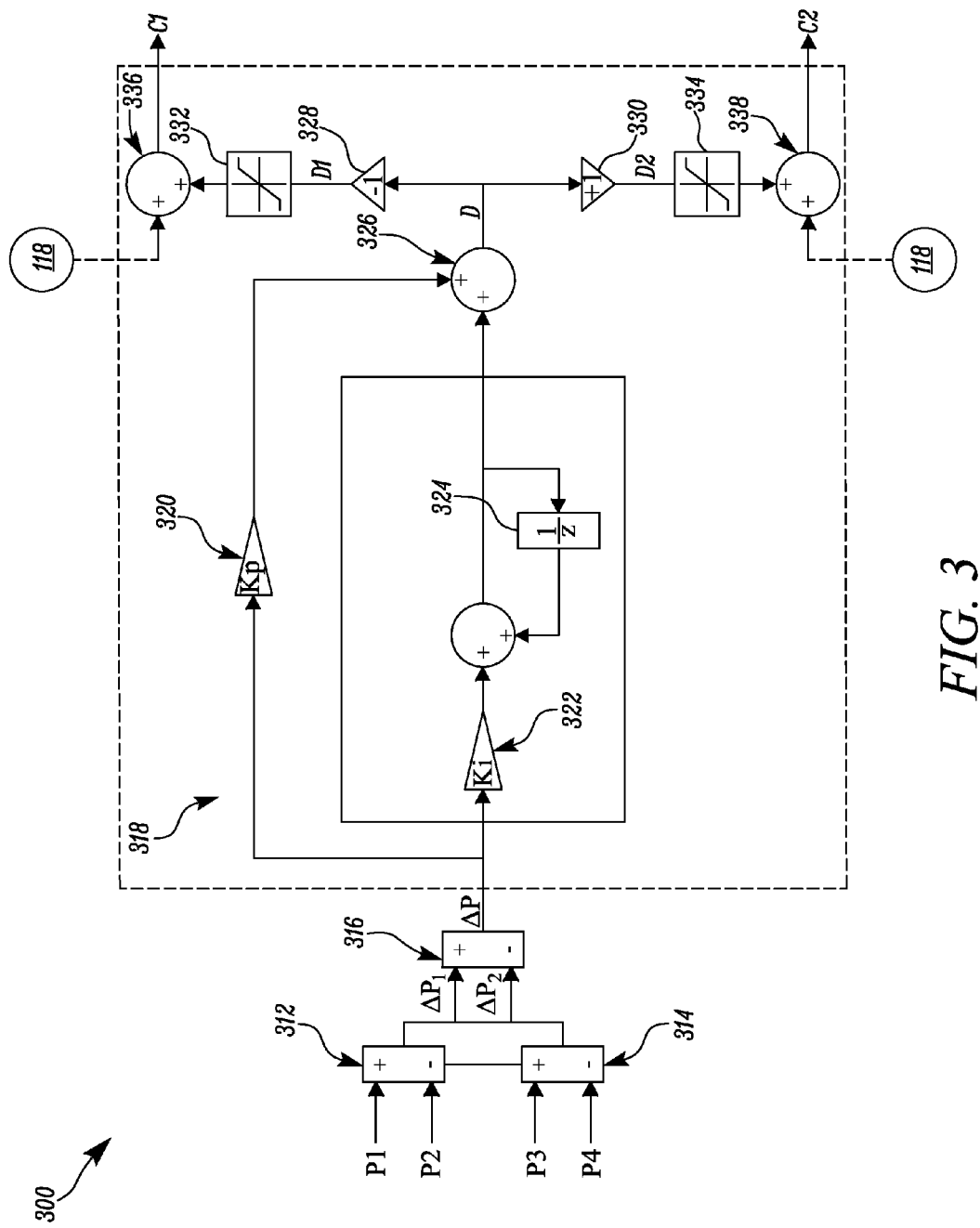
FIG. 3 illustrates a schematic view of a controller for the hydrostatic drive system, in accordance with an embodiment of the present disclosure.

FIG. 3 illustrates a block diagram of the controller 300, according to an aspect of the present disclosure. As illustrated, the first pressure signal P1 and the second pressure signal P2 from the first pressure sensor 224 and the second pressure sensor 226 are supplied to a first logic element 312. Further, the third pressure signal P3 and the fourth pressure signal P4 from the third pressure sensor 244 and the fourth pressure sensor 246 are supplied to a second logic element 314. In an exemplary aspect, the first logic element 312 and the second logic element 314 may be adder-subtractor circuit. The first logic element 312 may be configured to provide a first pressure difference $\Delta P_1$ between the first pressure signal P1 and the second pressure signal P2. The second logic element 314 may be configured to provide a second pressure difference $\Delta P_2$ between the third pressure P3 and the fourth pressure P4. In an aspect of the present disclosure, the first pressure difference $\Delta P_1$ and the second pressure difference $\Delta P_2$ may correspond to the first pressure in the first hydraulic circuit 202 and the second pressure in the second hydraulic circuit 204 respectively.

Further, the first pressure difference $\Delta P_1$ and the second pressure difference $\Delta P_2$ may be supplied to a third logic element 316. In an exemplary aspect, the third logic element 316 may also be an adder-subtractor circuit to provide the pressure difference $\Delta P$ as a difference between the first pressure difference $\Delta P_1$ and the second pressure difference $\Delta P_2$. In an aspect of the present disclosure, the pressure difference $\Delta P$ may be a measure of pressure imbalance associated with the hydrostatic drive system 200. The pressure difference $\Delta P$ is equal to zero when there is no pressure imbalance in the hydrostatic drive system 200. However, when there is pressure imbalance, then the pressure difference $\Delta P$ is supplied to a control unit 318 configured to output the first output control signal C1 and the second output control signal C2 via the first and the second communication links 308 and 310.

For example, the control unit 318 is a proportional integral (PI) controller using a PI algorithm. The control unit 318 may include a proportional control 320, and an integral control 322. It may be apparent to a person having ordinary skill in the art that, the PI controller algorithm may include a proportional gain factor ($K_P$) and an integral gain factor ($K_I$) associated with the proportional control 320 and the integral control 322 respectively. The proportional gain factor ($K_P$) may be proportional to the pressure difference $\Delta P$. In an aspect of the present disclosure, the controller 300 may include a lookup table to store a proportionate value of the proportional gain factor ($K_P$) for corresponding pressure difference $\Delta P$. Therefore, the controller 300 may select the value of the proportional gain factor ($K_P$) from the lookup table.

Further, in an aspect, the integral gain factor ($K_I$) may be configured to be maintained at a pre-determined value while the difference between the first pressure and the second pressure is greater than zero. In an exemplary aspect, the predetermined value of the integral gain factor ($K_I$) may also be stored in the lookup table. Further, the integral gain factor ($K_I$) may be reset based on an operator command received from the operator input devices 118, when the operator command is to stop the machine 100.

Furthermore, a unit delay block 324 is provided within the control unit 318 of the controller 300 to implement a delay using a pre-determined sample time to input the real time pressure difference $\Delta P$.

Furthermore, output signals from the proportional control 320 and the integral control 322 may be supplied to a fourth logic element 326 configured to output an adjustment value D. In an aspect of the present disclosure, the adjustment value D may be indicative of an adjustment pressure needed to be increased and decreased from the first pressure and the second pressure of the first hydraulic circuit 202 and the second hydraulic circuit 204, or vice-versa, to maintain a pressure balance between the two hydraulic circuits 202 and 204. In an aspect, the fourth logic element 326 may also be an adder-subtractor circuit.

Furthermore, the adjustment value D may be supplied to a first multiplier unit 328 and a second multiplier unit 330 associated with the first hydraulic circuit 202 and the second hydraulic circuit 204 respectively. In an aspect of the present disclosure, the first multiplier unit 328 may be a negative multiplier unit configured to provide a negative adjustment value D1. Further, the second multiplier unit 330 may be a positive multiplier unit configured to provide a positive adjustment value D2.

Further, the control unit 318 may include a first limiter 332 associated with the first pump 206 and a second limiter 334 associated with the second pump 228. The first and the second limiter 332, 334 may be configured to provide a limit associated with the maximum and the minimum displacement associated with the first pump 206 and the second pump 228 respectively. In an aspect of the present disclosure, the limits of the first pump 206 and the second pump 228 may be based on the position limits of the respective swash plates 210 and 232. The adjustment values D1 and D2 may be passed through the respective limiters 332 and 334 to ensure that the adjustment values D1 and D2 are maintained within the limits of the first swash plate 210 and the second swash plate 232 respectively.

Furthermore, the control unit 318 may include a fifth logic element 336 configured to provide the first output control signal C1 to the first swash plate control valve 212 associated with the first swash plate 210 of the first pump 206. In an aspect of the present disclosure, the fifth logic element 336 may receive the first adjustment value D1 from the first limiter 332 and an input signal from the operator input devices 118 of the machine 100. Further, the fifth logic element 336 may calculate the first output control signal C1 based on the first adjustment value D1 and the input signal from the operator input devices 118.

The control unit 318 may further include a sixth logic element 338 configured to provide the second output control signal C2 to the second swash plate control valve 234 associated with the second swash plate 232 of the second pump 228. In an aspect of the present disclosure, the sixth logic element 338 may receive the second adjustment value D2 from the second limiter 334 and the input signal from the operator input devices 118 of the machine 100. Further, the sixth logic element 338 may calculate the second output control signal C2 based on the second adjustment value D2 and the input signal from the operator input devices 118.

Furthermore, the controller 300 may be configured to adjust the displacement of the first pump 206 and the second pump 228 based on the first output control signal C1 and the second output control signal C2 to maintain the pressure balance between the first hydraulic circuit 202 and the second hydraulic circuit 204. For example, the pressure in either of the first hydraulic circuit 202 and the second hydraulic circuit 204 having low pressure may be adjusted to a high pressure and the circuit with high pressure may be adjusted to lower the pressure, thereby maintaining the pressure balance between the two hydraulic circuits 202, 204. Although, the illustrated embodiment shows that the pressure is decreased by using the negative adjustment value D1 at the first pump 206 and is increased by using the positive adjustment value D2 at the second pump 228, it will be appreciated by a person skilled in the art that the vice-versa may also implemented without deviating from the scope of the present disclosure.

INDUSTRIAL APPLICABILITY

The industrial applicability of the hydrostatic drive system 200 and the controller 300 for maintaining the pressure balance between multiple hydraulic circuits 202, 204 in the hydrostatic drive system 200 described herein will be readily appreciated from the foregoing discussion. Large wheel base type of machines, such as motor grader, generally have hydrostatic drive systems for driving the rear wheels or tracks, whereas the front wheels may be used for steering only and non-powered. During operations, there may be pressure fluctuations and imbalance between the individual hydraulic circuits of the hydrostatic drive system, due to size of the wheels, calibration errors, or fluid leakage etc. The pressure imbalance in these circuits may cause unnecessary turning of the machine. Further, an operator may tend to compensate for the pressure imbalance by manually steering the front wheels without realizing the pressure imbalance between the hydraulic circuits driving the rear wheels. This may result in energy loss in the hydrostatic drive system and loss of efficiency of the machine.

In an aspect, the controller 300 uses pressure sensors 224, 226, 244 and 246 to determine the pressures in the first and the second hydraulic circuits 202, 204 and adjust the pressures in first and the second hydraulic circuits 202, 204 to maintain the pressure balance. Using pressure sensors is cost effective and the closed loop implementation by the controller 300 provides pressure balance continuously throughout the machine operations.

Figure 4:
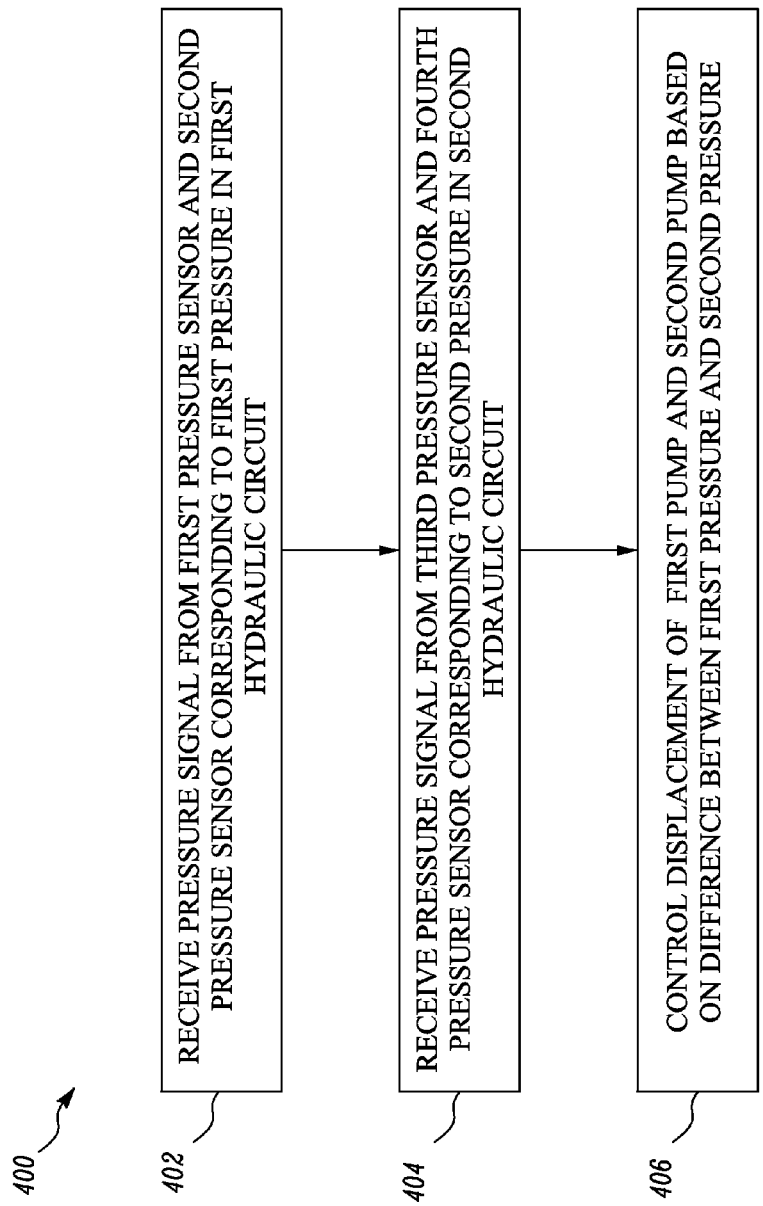
FIG. 4 illustrates a flowchart for an exemplary method for maintaining a pressure balance between multiple hydraulic circuits in the hydrostatic drive system, according to an embodiment of the present disclosure.

FIG. 4 illustrates an exemplary method 400 for maintaining the pressure balance between the first hydraulic circuit 202 having the first pump 206 and the second hydraulic circuit 204 having the second pump 228 in the hydrostatic drive system 200.

Initially, at step 402, pressure signals P1 and P2 from the first pressure sensor 224 and the second pressure sensor 226 respectively, may be received by the controller 300. In an aspect of the present disclosure, the first pressure signal P1 and the second pressure signal P2 from the first pressure sensor 224 and the second pressure sensor 226 are received at the first logic element 312 of the controller 300. The first pressure sensor 224 and the second pressure sensor 226 may be provided at the first port 218 and the second port 220 of the first pump 206 respectively. The pressure sensors 224, 226 may be configured to detect the real time pressure associated with the first pump conduit 214 and the second pump conduit 216 respectively. In an aspect of the present disclosure, the pressure sensors 224, 226 may be configured to provide pressure signals indicative of the first pressure associated with the first hydraulic circuit 202. For example, the pressure signals from the pressure sensors 224, 226, may be in the form of a voltage signal or a current signal. In an aspect of the present disclosure, a first pressure difference $\Delta P_1$ between the first pressure signal P1 and the second pressure signal P2 may be provided by the first logic element 312. For example, the first pressure difference $\Delta P_1$ may correspond to the first pressure in the first hydraulic circuit 202.

Further, at step 404, pressure signals P3 and P4 from the third pressure sensor 244 and the fourth pressure sensor 246 respectively may be received. In an aspect of the present disclosure, the third pressure signal P3 and the fourth pressure signal P4 from the third pressure sensor 244 and the fourth pressure sensor 246 are received at the second logic element 314 of the controller 300. The third pressure sensor 244 and the fourth pressure sensor 246 may be provided at the first port 240 and the second port 242 of the second pump 228 respectively. The pressure sensors 244, 246 may be configured to detect the real time pressure associated with the third pump conduit 236 and the fourth pump conduit 238 respectively. In an aspect of the present disclosure, the pressure sensors 244, 246 may be configured to provide pressure signals indicative of the second pressure associated with the second hydraulic circuit 204. For example, the pressure signals from the pressure sensors 244, 246 may be in the form of a voltage signal or a current signal. In an aspect of the present disclosure, a second pressure difference $\Delta P_2$ between the third pressure signal P3 and the fourth pressure signal P4 may be provided by the second logic element 314. For example, the second pressure difference $\Delta P_2$ may correspond to the second pressure in the second hydraulic circuit 204.

Further, the first pressure difference $\Delta P_1$ and the second pressure difference $\Delta P_2$ may be received at the third logic element 316. In an exemplary aspect, the pressure difference $\Delta P$ between the first pressure difference $\Delta P_1$ and the second pressure difference $\Delta P_2$ may be provided by the third logic element 316. In an aspect of the present disclosure, the pressure difference $\Delta P$ may be a measure of the pressure imbalance associated with the hydrostatic drive system 200.

Further, at step 406, the first pump 206 and the second pump 228 may be controlled based on the pressure difference $\Delta P$. In an aspect of the present disclosure, the pressure difference $\Delta P$ may be received at the control unit 318 to be minimized and to maintain the pressure balance between the first hydraulic circuit 202 and the second hydraulic circuit 204. Further, the control unit 318 is configured to output the first output control signal C1 and the second output control signal C2 based on the pressure difference $\Delta P$.

Furthermore, the first output control signal C1 may be provided to the first swash plate control valve 212 via the first solenoid valve 250 to adjust the position of the first swash plate 210 associated with the first pump 206. Similarly, the second output control signal C2 may be provided to the second swash plate control valve 234 via the second solenoid valve 252 to adjust the position of the second swash plate 232 associated with the second pump 228. The positions of the first and the second swash plates 210 and 232 are adjusted to adjust by increasing and/or decreasing, the first pressure and the second pressure of the first hydraulic circuit 202 and the second hydraulic circuit 204 to maintain the pressure balance between the first hydraulic circuit 202 and the second hydraulic circuit 204.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A hydrostatic drive system for a machine comprising:
   a first hydraulic circuit including:
   a first variable displacement pump; and
   a first hydraulic motor configured to selectively receive a flow of pressurized hydraulic fluid from the first variable displacement pump at a first pressure;
   a second hydraulic circuit including:
   a second variable displacement pump; and
   a second hydraulic motor configured to selectively receive the flow of pressurized hydraulic fluid from the second variable displacement pump at a second pressure; and
   a controller configured to generate a single command signal directed to each of the first and second variable displacement pumps based on a pressure imbalance between the first pressure and the second pressure and to thereby increase the displacement of one of the first and second variable displacement pumps and decrease the displacement of the other of the first and second variable displacement pumps, the single command signal being indicative of an adjustment pressure by which one of the first pressure and second pressure is to be increased and the other of the first pressure and second pressure is to be decreased in order to maintain a pressure balance between the first and the second hydraulic circuits.

2. The hydrostatic drive system of claim 1, wherein the first variable displacement pump includes a first swash plate connected to a first swash plate control valve, and wherein the controller uses the single command signal to output a first output control signal to a first solenoid valve associated with the first swash plate control valve.

3. The hydrostatic drive system of claim 2, wherein the first solenoid valve is configured to adjust the first pressure based on the first output control signal.

4. The hydrostatic drive system of claim 1, wherein the second variable displacement pump includes a second swash plate connected to a second swash plate control valve, and wherein the controller uses the single command signal to output a second control signal to a second solenoid valve associated with the second swash plate control valve.

5. The hydrostatic drive system of claim 4, wherein the second solenoid valve is configured to adjust the second pressure based on the second output control signal.

6. The hydrostatic drive system of claim 1, wherein the controller is configured to receive pressure signals from a first pressure sensor and a second pressure sensor provided on a first port and a second port of the first pump respectively, and wherein the pressure signals correspond to the first pressure in the first hydraulic circuit.

7. The hydrostatic drive system of claim 1, wherein the controller is configured to receive a pressure signal from the third pressure sensor and the fourth pressure sensor provided on a first port and a second port of the second pump respectively, and wherein pressure signals correspond to the second pressure in the second hydraulic circuit.

8. The hydrostatic drive system of claim 1, wherein the controller includes a proportional-integral (PI) controller having a proportional control and an integral control.

9. The hydrostatic drive system of claim 8, wherein an integral gain factor associated with PI controller is configured to be maintained at a pre-determined value while the difference between the first pressure and the second pressure is greater than zero.

10. A machine comprising:
ground engaging members disposed on a first side and a second side of the machine;
a power source; and
a hydrostatic drive system operatively coupling the power source to the ground engaging members, the hydrostatic drive system including:
a first hydraulic circuit including:
a first variable displacement pump; and
a first hydraulic motor configured to selectively receive a flow of pressurized hydraulic fluid from the first variable displacement pump at a first pressure;
a second hydraulic circuit including:
a second variable displacement pump; and
a second hydraulic motor configured to selectively receive the flow of pressurized hydraulic fluid from the second variable displacement pump at a second pressure; and
a controller configured to generate a single command signal directed to each of the first and second variable displacement pumps based on a pressure imbalance between the first pressure and the second pressure and to thereby increase the displacement of one of the first and second variable displacement pumps and decrease the displacement of the other of the first and second variable displacement pumps, the single command signal being indicative of an adjustment pressure by which one of the first pressure and second pressure is to be increased and the other of the first pressure and second pressure is to be decreased in order to maintain a pressure balance between the first and the second hydraulic circuits.

11. The machine of claim 10, wherein the first variable displacement pump includes a first swash plate connected to a first swash plate control valve, and wherein the controller uses the single command signal to output a first output control signal to a first solenoid valve associated with the first swash plate control valve.

12. The machine of claim 11, wherein the first solenoid valve is configured to adjust the first pressure based on the first output control signal.

13. The machine of claim 10, wherein the second variable displacement pump includes a second swash plate connected to a second swash plate control valve, and wherein the controller uses the single command signal to output a second control signal to a second solenoid valve associated with the second swash plate control valve.

14. The machine of claim 13, wherein the second solenoid valve is configured to adjust the second pressure based on the second output control signal.

15. The machine of claim 10, wherein the controller is configured to receive pressure signals from a first pressure sensor and a second pressure sensor provided on a first port and a second port of the first pump respectively, and wherein the pressure signals correspond to the first pressure in the first hydraulic circuit.

16. The machine of claim 10, wherein the controller is configured to receive a pressure signal from the third pressure sensor and the fourth pressure sensor provided on a first port and a second port of the second pump respectively, and wherein pressure signals correspond to the second pressure in the second hydraulic circuit.

17. The machine of claim 10, wherein the controller includes a proportional-integral (PI) controller having a proportional control and an integral control.

18. The machine of claim 17, wherein an integral gain factor associated with PI controller is configured to be maintained at a pre-determined value while the difference between the first pressure and the second pressure is greater than zero.

19. A method for maintaining a pressure balance between a first hydraulic circuit having a first variable displacement pump and a second hydraulic circuit having a second variable displacement pump in a hydrostatic drive system, the method comprising:
receiving pressure signals from a first pressure sensor and a second pressure sensor corresponding to a first pressure in the first hydraulic circuit;
receiving pressure signals from a third pressure sensor and a fourth pressure sensor corresponding to a second pressure in the second hydraulic circuit; and
controlling displacement of the first pump and the second pump by generating a single command signal directed to each of the first and second variable displacement pumps based on a pressure imbalance between the first pressure and the second pressure and to thereby increase the displacement of one of the first and second variable displacement pumps and decrease the displacement of the other of the first and second variable displacement pumps, the single command signal being indicative of an adjustment pressure by which one of the first pressure and second pressure is to be increased and the other of the first pressure and second pressure is to be decreased in order to maintain a pressure balance between the first and second hydraulic circuits.

\* \* \* \* \*